April 27, 1965
C. L. FARRAND ETAL
3,181,095
PRECISION TRANSDUCERS
Filed May 18, 1960
7 Sheets-Sheet 1
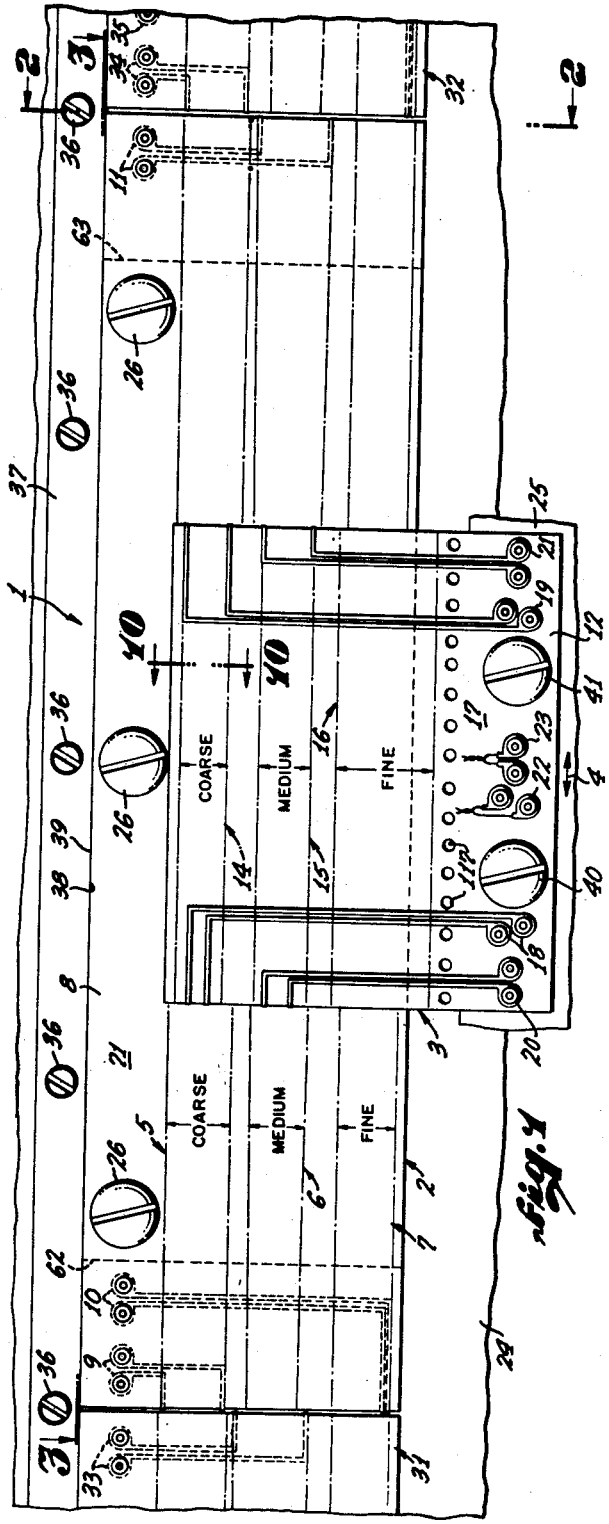
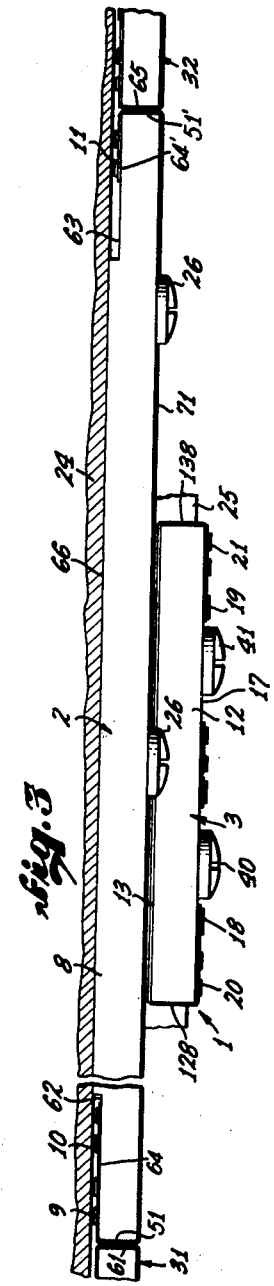
CLAIR L. FARRAND &
ROBERT W. TRIPP,
INVENTORS.
BY *W E Beatty*
ATTORNEY.

April 27, 1965
C. L. FARRAND ETAL
3,181,095
PRECISION TRANSDUCERS
Filed May 18, 1960
7 Sheets-Sheet 2
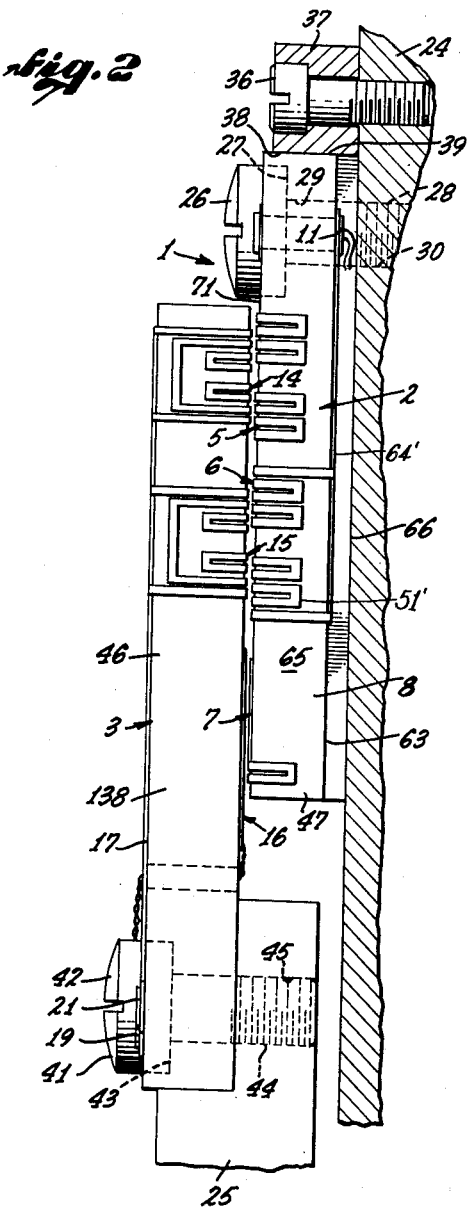
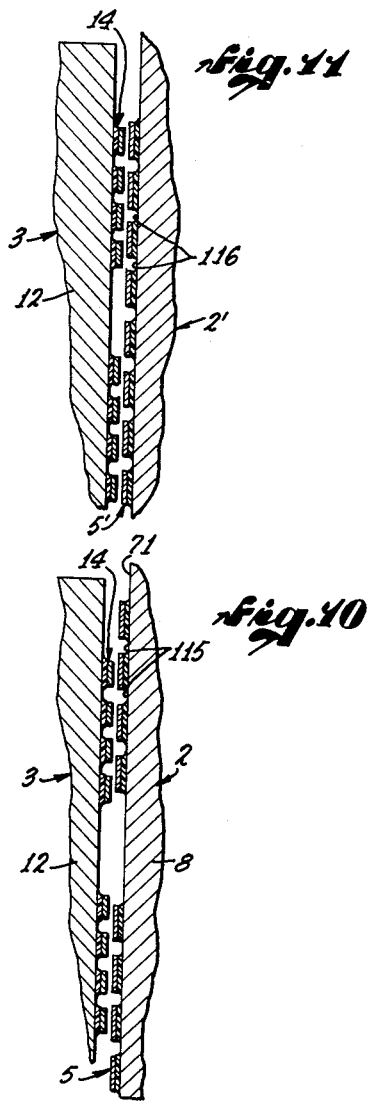
CLAIR L. FARRAND &
ROBERT W. TRIPP,
INVENTORS.
BY W. E. Beatty
ATTORNEY.

April 27, 1965     C. L. FARRAND ETAL     3,181,095
PRECISION TRANSDUCERS
Filed May 18, 1960     7 Sheets-Sheet 3

*Fig. 4*

CLAIR L. FARRAND &
ROBERT W. TRIPP,
    INVENTORS.

BY *W. E. Beatty*
    ATTORNEY.

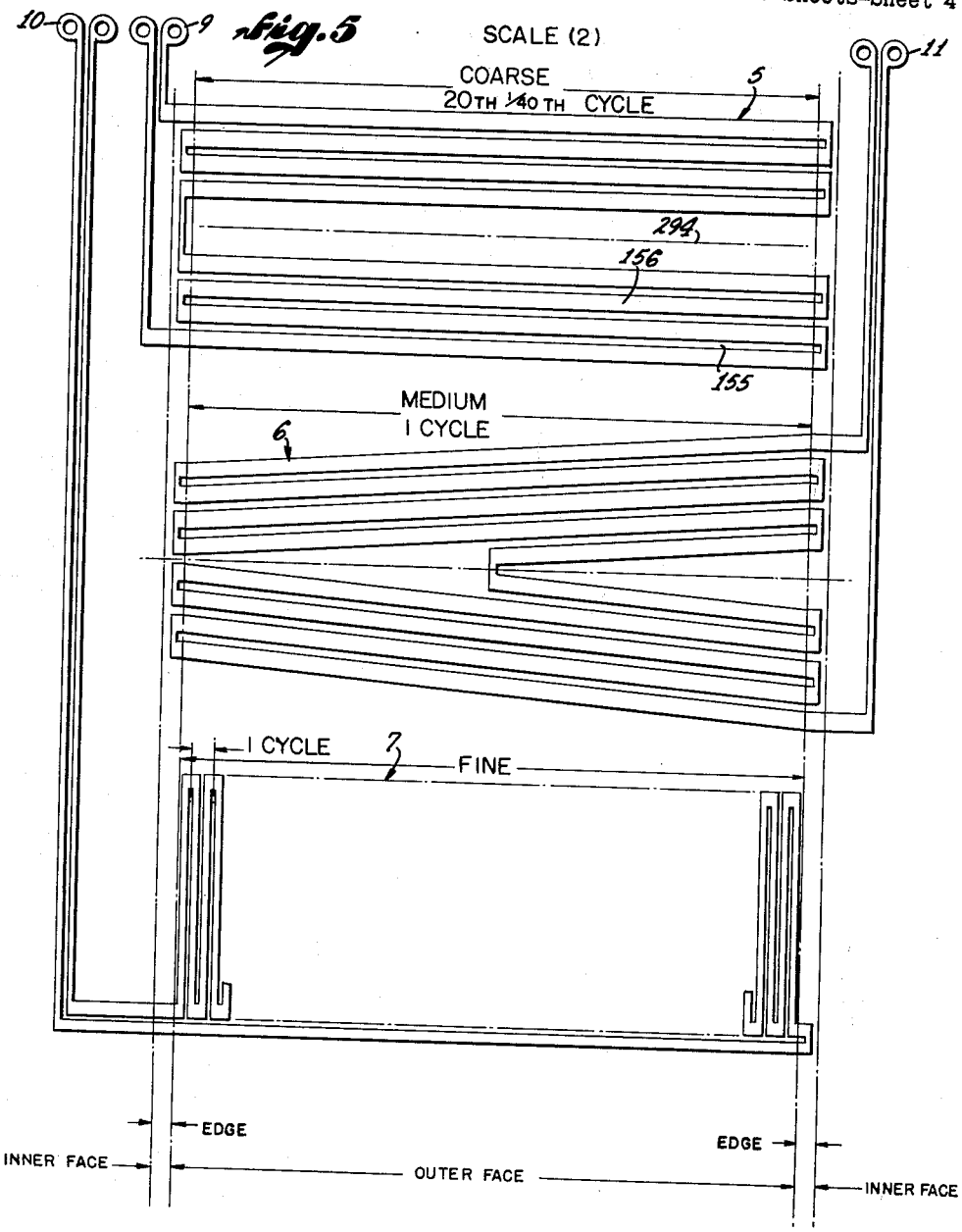

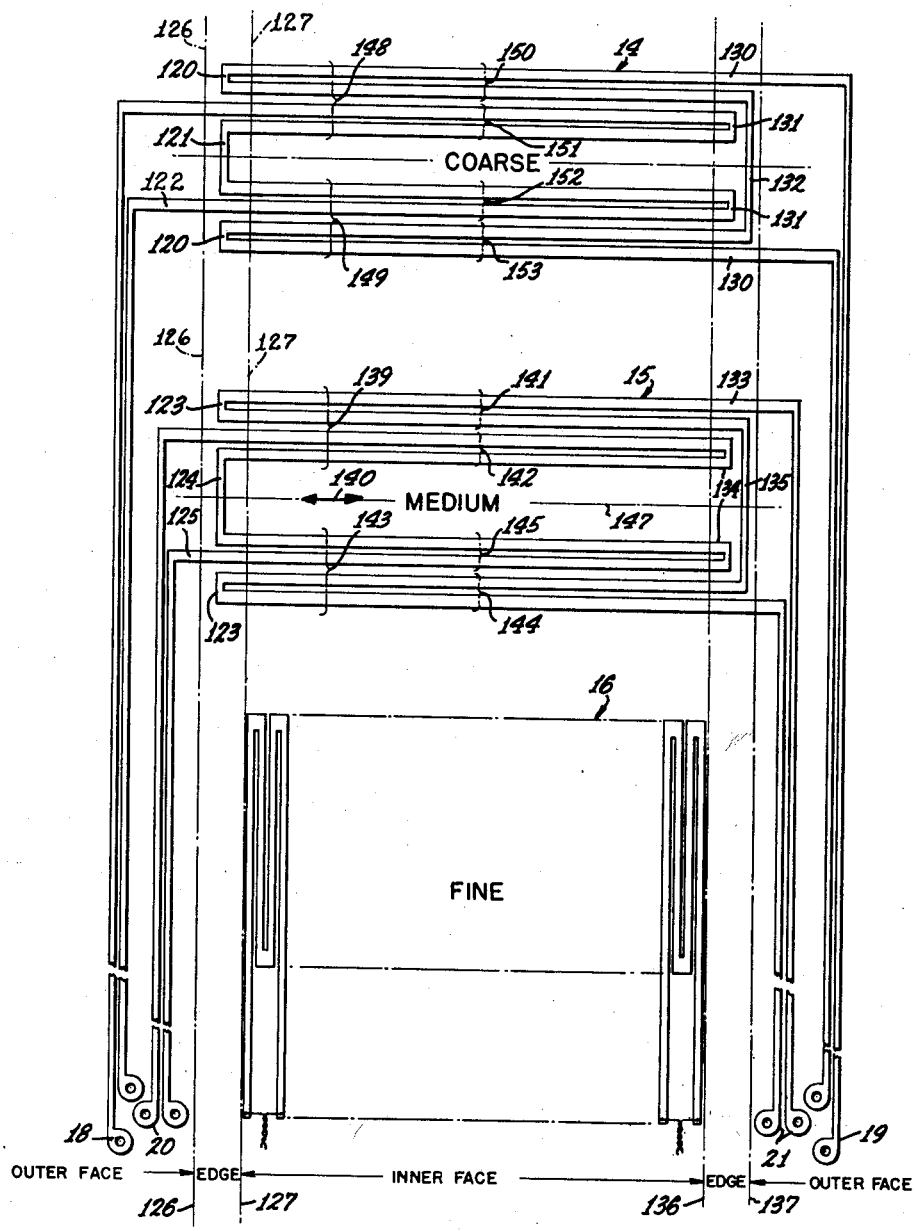

April 27, 1965   C. L. FARRAND ETAL   3,181,095
PRECISION TRANSDUCERS
Filed May 18, 1960   7 Sheets-Sheet 6
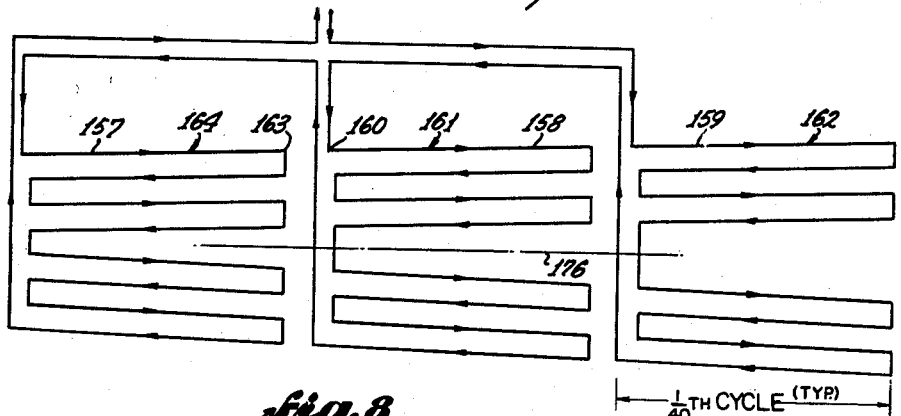
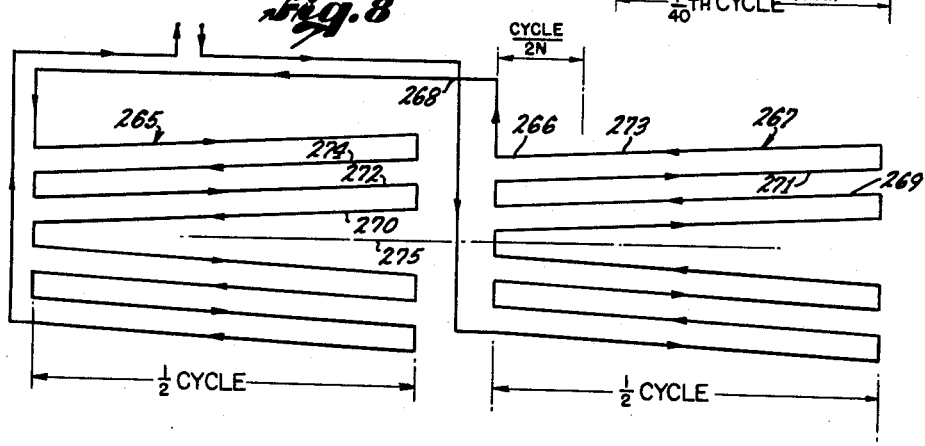
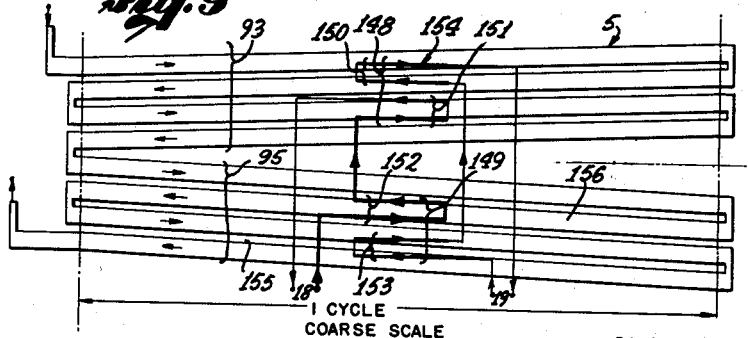
CLAIR L. FARRAND &
ROBERT W. TRIPP,
INVENTORS.
BY W. E. Beatty
ATTORNEY.

April 27, 1965

C. L. FARRAND ETAL 3,181,095

PRECISION TRANSDUCERS

Filed May 18, 1960

CLAIR L. FARRAND &
ROBERT W. TRIPP,
INVENTORS.

BY W. E. Beatty

ATTORNEY.

United States Patent Office 3,181,095
Patented Apr. 27, 1965

3,181,095
PRECISION TRANSDUCERS
Clair L. Farrand, Bronxville, and Robert W. Tripp, Eastchester, N.Y., assignors to Inductosyn Corporation, Carson City, Nev., a corporation of Nevada
Filed May 18, 1960, Ser. No. 29,972
8 Claims. (Cl. 336—30)

This invention relates to improvements in precision transducers of the "Inductosyn" type as generally described and illustrated in U.S. Patent No. 2,799,835. The invention has for its principal object the provision of a novel multiple transducer comprising two unitary members each having integral therewith a plurality of adjacently disposed sections or separate fine, medium and coarse grades of windings, and which members in relative movement and electrical association perform with high accuracy coarse and/or medium and fine functions in corresponding space cycles for position measurement or determination.

Transducers of linear form for position measurement or determination of the type of said U.S. Patent No. 2,799,-835 have two or more poles and relative linear movement between two poles constitutes a space cycle of the coupling wave. For accuracy, the coupling wave should be and remain sinusoidal in form, and any departure therefrom is undersirable and results in error. As applied to the positioning of the carriage of a machine to minute dimensions multiple poles are employed with small space cycles.

For linear fine transducers it has been convenient to employ a space cycle of 0.1 inch. When a space cycle of 0.1 inch is used for the fine measurement, a positioning accuracy of 16 micro inches or better is attained. It is also convenient in this circumstance to employ a space cycle of about one hundred times longer for succeeding coarser measurements. A typical example to be described hereinafter employs space cycles of 0.1 inch for fine; 10 inches for medium; and 400 inches for coarse. This provides a maximum travel of 400 inches. For this typical case the "fine" transducer may be a multi-pole device as described in the above-referred-to Patent No. 2, 799,835.

Prior to the present invention separate two-pole conventional resolvers for "coarse" and "medium" were used with appropriate gearing to the carriage of a machine, for example, so that one complete revolution of each resolver is made in its space cycle.

It is essential for the transducer to produce a signal that is direction-sensitive. This is accomplished by referring the coupling wave to the original source, as well known. The signal thus produced will be of the correct direction sense when the transducer is within one-half cycle of its null. While almost a whole cycle is usable, it is usually desirable to switch to the coarser transducer when the finer transducer is producing a maximum signal which occurs at one-quarter cycle from its null. Switching means which are well known are employed in a conventional manner to switch from coarse to medium within one-quarter of a medium cycle, and from medium to fine within one-quarter of a fine cycle. It is necessary that the coupling waves of the transducer be synchronized so that the polarity and phase of their signals coincide. This has been termed zeroing. Since the switch point must lie within one-half cycle, the maximum tolerance on the position of the switching point is plus or minus one-quarter of a cycle and in practice a tolerance of plus or minus one-tenth of a cycle is desirable. Switching within these tolerances prevents an ambiguity and also insures that the final position is determined by the fine transducer.

Backlash in the gearing between the coarse and medium transducers may cause the one-quarter cycle tolerance to be exceeded. Likewise, backlash between the medium resolver and the carriage may cause the tolerance of one-quarter of a fine cycle or .025 inch to be exceeded, causing position error. It is not unusual for a machine tool having a travel of 200 inches to have backlash in its carriage drive of .020 or .030 inch. In such cases it has been necessary to provide backlash compensation in the form of an approximately equal backlash in the medium transducer gear train. Backlash, however, does not tend to remain constant over the whole range of travel and such means are only partially helpful. Geared transducers and backlash compensation, moreover, are costly and cause errors.

In accordance with the present invention a single two-member multiple transducer is provided for performing coarse and/or medium and fine functions, thus eliminating the necessity of employing separate gear-driven resolvers with consequent avoidance of gear drives and backlash difficulties attendant thereupon.

The invention makes possible for the first time an all-electric "Inductosyn" type position measurement or determination control system without the use of gears or their equivalent and the achievement of coarse and/or medium and fine functions with two members only in relative movement electrical association.

Among advantages of the invention are that it provides:

(a) A precision linear transducer having a space cycle of the order of ten (10) inches;

(b) A precision linear transducer having a space cycle of the order of several hundred inches;

(c) A precision linear transducer of relatively long space cycle substantially avoiding errors due to non-rectilinear motion.

(d) Low cost and simplicity of control equipment.

(e) A sectionalized multiple transducer having sections fitting end-to-end to accommodate a desired length of travel, each section having a plurality of sets of windings representing different space cycle increments.

(f) A sectionalized multiple transducer wherein each section has a support for transducer windings of different space cycle values, each winding having leads so arranged as to avoid coupling with the leads or conductors of other windings.

(g) A single multiple transducer performing coarse and/or medium and fine functions having its windings geometrically positioned to produce an electrical zero at a chosen linear position.

(h) Avoidance of reading erors due to transforming one type of motion (like linear) to another type of motion (like rotary) for purposes of measurement.

(i) A transducer which is compenated for motion transverse to its operating direction.

(j) A transducer having relatively movable position measuring transformer members wherein position errors are reduced or avoided by extending the connecting portions of the active conductors away from and substantially at right angles to the plane of their respective active conductor portions.

The linear transducer of the present invention avoids positional errors due to lack of sinusoidal shape of the coupling wave by having only the active portions of the conductors of the windings coupled to each other. This desirable end is attained by removing the lead portion of the conductors from the plane of the active portion of the conductors of the transducer windings. As applied to a multiple transducer, this is accomplished by printing both portions of the conductors on one sheet as hereinafter described in more detail and positioning the active portion of the winding on the reverse face of the base or supporting member. The lead portion is then folded around and onto the edges of the base or supporting member and around and onto the reverse face of the base where the terminals are positioned. In this way the active portion of the conductors only are disposed in one plane. The lead portions of the conductors being bent around the edges of the base or supporting member assume a position at ninety degrees in the active portion of the conductors with consequent reduction of coupling. Since the remaining portion of the leads are bent around and onto the reverse side of the base or supporting member, they are remote from the active portion of the conductors and thus are substantially uncoupled thereto.

In a preferred embodiment of the invention the conductors of each of the two transformer members are disposed and supported upon bases of magnetic material as disclosed in the co-pending application of Clair L. Farrand, filed November 10, 1959, Serial No. 852,028.

For a complete understanding of the invention, reference should be made to the following detailed description to be considered in conjunction with the accompanying drawings in which—

FIG. 1 is a plan view of the multiple transducer of the invention, embodying relatively movable transformer members;

FIG. 2 is an enlarged (double size, as compared to FIGS. 1 and 3) sectional view on line 2—2 of FIG. 1;

FIG. 3 is a foreshortened sectional view on line 3—3 of FIG. 1;

FIG. 4 is a developed plan view of one section of the single-phase windings of the transducer of FIG. 1, the scale being enlarged four times in a vertical direction and reduced to one-half normal in the horizontal direction;

FIG. 5 is a view similar to FIG. 4, of another section of the single-phase windings of the transducer, enlarged four times in the vertical direction and reduced to one-half normal in the horizontal direction;

FIG. 6 is a developed plan view of the coarse, medium and fine space quadrature windings of the transducer of FIG. 1, the scale being normal, that is the same as FIGS. 1 and 3 in a horizontal direction and enlarged four times in a vertical direction;

FIG. 7 is a schematic diagram of the connections of three typical single-phase coarse windings like the coarse winding of FIG. 4, comprising a fraction of a space cycle;

FIG. 8 is a schematic diagram illustrating how a group of coarse single-phase windings, like FIG. 7, constituting a half-space cycle, may be connected with one or more of the same windings to extend the space cycle, the lines representing the centers of the conductors;

FIG. 9 is a schematic diagram of the current relations and connections of the single-phase and quadrature windings of the coarse transducer;

FIG. 10 is an enlarged fragmentary cross sectional view as taken substantially along the line 10—10 of FIG. 1 illustrating the relative position of the coarse windings of the slider to the coarse winding of the scale at one end thereof;

FIG. 11 is a cross sectional view similar to FIG. 10 enlarged to illustrate the relative position of said coarse winding of the slider to the scale at the other end thereof;

FIG. 12 is a schematic wiring diagram illustrating the wiring of the quadrature windings of the slider in greater detail;

FIG. 13 is an enlarged perspective view, with parts broken away of a typical end portion of one of the scales, like FIGS. 4 or 5, illustrating how the copper sheet with a pattern of conductors and leads is folded over the edge of the support to avoid coupling the lead of one transducer section with the leads of another transducer section or with the conductors of the transducer sections.

Figure 42:
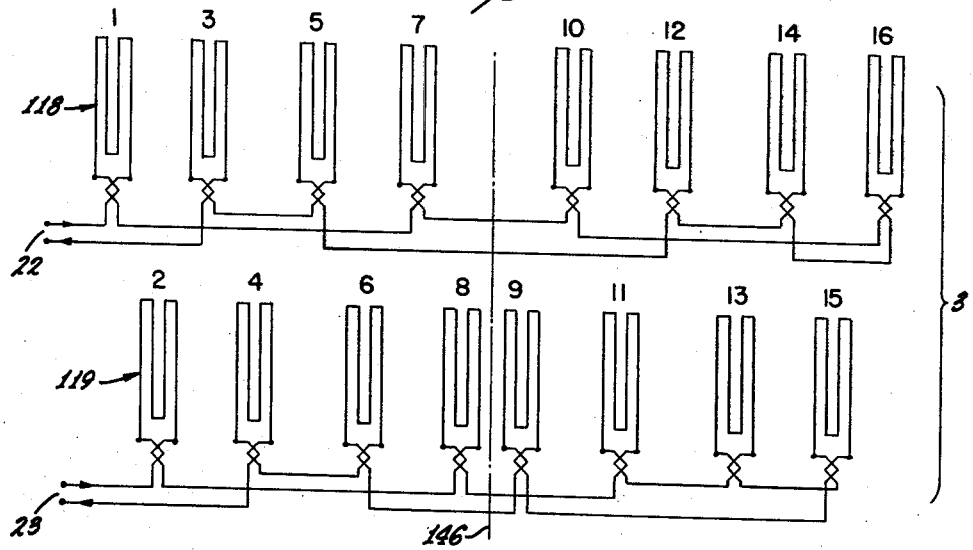
Figure 43:
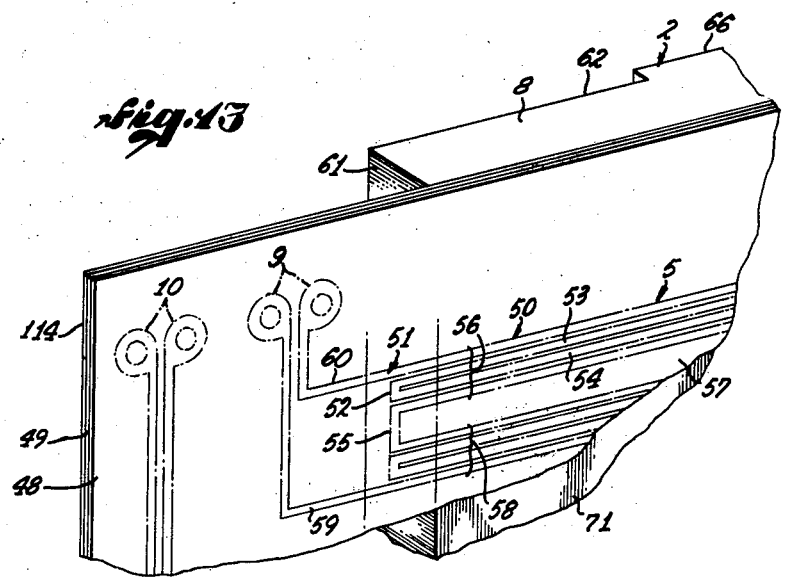

Referring now to FIG. 1 of the drawings, the multiple transducer 1 comprises transformer members 2 and 3 which are relatively movable in a horizontal direction as seen in FIG. 1 as indicated by the arrow 4. The transducer member 2 will be referred to as a scale, while the element 3 will be identified as a slider. By way of example, the scale 2 may be 10 inches long, while the slider 3 may be 3.6 inches long, in the direction of relative motion.

The scale 2 has three single-phase continuous windings of different grades, namely a winding 5 having a coarse value of space cycle, a winding 6 having a medium value of space cycle and a winding 7 having a fine value of space cycle. The windings 5, 6 and 7 are arranged in one plane and mounted on the outer face 71 of a supporting base 8 as described hereinafter. The terminals of windings 5 and 7 are arranged at the reverse side of the support or base 8 as indicated at 9 and 10, at the left end of base 8. The terminals for winding 6 are also at the reverse sides of the support or base and at the other side thereof as indicated at 11.

The slider 3 also has a support or base 12, similar to base 8, and on the inner face 13 of which are arranged in one plane the active conductor portions of coarse, medium and fine windings 14, 15 and 16 each of which comprises windings in space quadrature of the pole cycle of their respective scale windings 5, 6 and 7. The terminals for the windings 14, 15 and 16 are on the reverse side from inner face 13. This reverse side as indicated at 17, appears as the front in FIG. 1. The terminals for the quadrature windings 14 are indicated at 18 and 19; the terminals for the quadrature windings 15 are indicated at 20 and 21; and, the terminals for the quadrature windings 16 are indicated at 22 and 23.

As shown in FIG. 3, the rear face of one end of base 8 is recessed to provide an offset surface 62 on which the terminals 9 and 10 are mounted, the terminals 11 being mounted on a similar offset surface 63 at the other end of the base.

The slider travels with active conductor portions of windings 14, 15 and 16 parallel to and in close space relation to the active conductors of windings 5, 6 and 7.

FIG. 2 shows a machine having relatively movable parts 24 and 25. For example, the machine part 24 may be stationary, and the scale 2 is fixed to it by a series of bolts indicated at 26, three being shown in FIG. 1. These bolts each have a head which engages a counter-sunk shoulder like 27 in FIG. 2, and also have a threaded shank like 28 which passes through a hole like 29 in the base 8 in threaded engagement with a threaded hole 30 in the machine part 24.

The scale 2 for example may be 10 inches long, and since the invention contemplates machine parts having a relative travel of 400 inches, forty of such scales would be provided. In any case, the number of scales 2 provided is sufficient to cover the required length of travel. The scale 2 shown in full in FIG. 1 may represent any scale of a series, although for convenience in connection with the explanation of the diagram in FIG. 8, it is assumed that the scale indicated at 2 in FIG. 1 is the 20th scale of a series of 20 or more, the 19th scale being indicated at 31, the 21st scale being indicated at 32. At the right end of the scale 31, at the reverse side thereof are terminals 33 which correspond to the terminals 11 at the right reverse end of base 8, while the terminals 34 and 35 at the reverse left end of scale 32 correspond to the terminals 9 and 10, as the arrangement of terminals is substantially the same for all scales in the series, the windings in certain respects being different as will be explained in connection with FIGS. 4 and 5. The one slider 3 serves the complete series of scales like 2, 31, 32 for the desired length of travel.

In order to vertically align all of the scales like 2, 31, 32, as shown in FIGS. 1 and 3, the machine part 24 has fixed thereto, by spaced bolts like 36, an edge guide strip 37 which extends the full length of the complete series of scale members like 2, 31 and 32. The strip 37 has a straight lower edge 38, the strip being fixed to the machine part 24 so that the edge 38 is horizontal and parallel to the line of travel of the slider 3, the scales like 3 having an upper straight edge 39, the bolts like 26 securing the scale bases like 8 to the machine part 24 with the straight edge like 39 of the base in abutting relation with the straight edge 38 of the edge guide strip 37.

The slider 3 is shown in FIGS. 1 to 3 as having two bolts 40 and 41 for securing the slider 3 to the machine part 25. The bolts 40 and 41 are similar to bolt 26, each having a head like 42, see FIG. 2 extending in a recess like 43 in the base 12, and having a threaded shank like 44 for a threaded socket 45 in the machine part 25.

The three transducers of FIG. 1 should be synchronized in space phase so that they have a common zero and the present invention provides for the geometrical phasing of a plurality of the several transducers on a common support. This is accomplished by arranging the relative positions of the conductors of the respective movable and stationary members.

When one space phase winding of one of the members is at minimum coupling with the winding of the other member, and the other space phase winding of the said member is at maximum coupling with the winding of the other member, the transducer may be considered to be at zero. This position would correspond to a zero digital input with a resultant maximum voltage applied to the space phase winding having zero coupling and a minimum voltage supplied to the space phase winding having maximum coupling.

It will be noted in FIG. 2 and FIG. 10 that the scales like 2, 31, 32 depend vertically from the machine part 24 to which they are fixed by bolts like 26, whereas the slider 3 arises from the other machine part 25 to which it is fixed by bolts 40 and 41. The upper portion 46 of the slider 3 and the lower portion like 47 of the scales, overlay each other in spaced relation, each of the portions 46 and 47 carrying their respective coarse, medium and fine windings. The sole mechanical connection between these windings and their machine parts 24 and 25 is provided by bolts 41 and 42, and by bolts like 26 of the respective bases 12 and 8 on which the coarse, medium and fine windings are mounted for inductive relation between the coarse, medium and fine space quadrature windings 14, 15 and 16 respectively, of the slider and the corresponding respective coarse, medium and fine windings 5, 6 and 7 of the scale.

Referring to FIG. 13, this partial view illustrates how the windings 5, 6 and 7 and their leads are mounted on base 8, and how the windings 14, 15, 16 and their leads are mounted on their base 12, the explanation being for example in connection with the base 8 of the scale which is shown in FIG. 13.

While bases 8 and 12 may be of insulating material as described in said Patent No. 2,799,835, they are preferably of iron material with the conductor pattern being bonded thereto as described and claimed in said co-pending application S.N. 852,028 referred to above.

In FIG. 4, the reference number 48 indicates a flexible sheet of copper having thereunder a sheet 49 of insulating bonding material. The sheet 49 of insulating bonding material may be of bonding material such as epoxy resin approximately two-thousandths of an inch thick, and on the other side of sheet 49 is a thin layer 114, similar to the bonding material 49 of polyamide cured epoxy resin for bonding the insulated copper sheet 48 and 49 to the base 8. As shown in FIG. 10 at 115 and in FIG. 11 at 116, the bonding material is removed from between the conductor bars of windings 5, 14 and 5'. This removal is performed by additional etching or with a suitable solvent, depending on the nature of the bonding material. Additional applications of photo-resist and exposures may be made as necessary, as described in said co-pending application S.N. 852,028 referred to above.

The conductor pattern, for example, as illustrated in connection with winding 5, is etched on the sheet 48, and treated to remove the copper where the pattern does not appear, by a well known process. In this case, the conductor pattern, for each of the windings 5, 6 and 7 and 14, 15, 16, as illustrated in FIG. 13 in connection with winding 5, comprises three parts, of which the pattern part 50, of the active parallel conductors, has a length the same as the length of its base 8, in the direction of relative motion of scale 2 and slider 3. A second pattern part indicated at 51 consists partly of return leads like 52 which connect adjacent conductor bars like 53 and 54 for reverse current flow in adjacent conductors and partly of end connections 55 which connect the group the conductors 56 on one side of the axis 57 in series with the group 58 of conductors on the other side of the axis. For a reason to be explained later, a third pattern portion consisting of the leads 59 and 60 having a length sufficient to extend across the edge 61 of base 8 and over the surface 62, at the reverse side of base 8, where the terminals 9 and 10 are located. The sheet 49 of insulating material and which is adherent to the copper sheet 48 is bonded to the face or outer surface 71, edge 61 and inner surface 62 of base 8, by epoxy resin or the like, the pattern part 51 extending in a fold over the edge 61 and the outermost pattern part 64 extending in a fold over the surface 62, see FIG. 3. The opposite end of the conductor pattern not shown in FIG. 13 similarly extends in a fold over and is bonded to (a) the other edge 65 of support 8, see FIG. 3, and (b) the inner surface 63 on which terminals 11 are mounted. The central portion 66 of the reverse or inner face of base 8 is mounted on the machine part 24, the surfaces 62 and 63 being offset below that surface to accommodate the terminals 9, 10 and 11.

The fold or edge pattern part 51 of the coarse scale winding appears also in FIG. 4 which shows in further details the continuous windings 5', 6' and 7' similar to windings 5, 6 and 7 and their leads which are mounted on a support like base 8, not shown in FIG. 4, and in a manner similar to that described in connection with FIG. 13.

The winding portions between the line 67 and the left margin of FIG. 4 show the winding portions 64 which are on the reverse or inner face like 62 of base 8, while the winding portions 64' between the line 68 and the right margin of FIG. 4 show the winding portions on the reverse or inner face like 63. The winding portions 51 between lines 67 and 69 show those portions of the conductor leads which extend in a fold on the edge like 61 of base 8, while the conductor leads 51' between the lines 70 and 68 show the winding portions which extend in a fold on the opposite edge like 65 of base 8. The conductor portions between the lines 69 and 70 are the active conductor portions of the respective windings 5', 6' and 7' on the outer face 71 of the base 8.

In FIG. 4, the fine winding 7' consists of active conductors like 72, 73, 74 and 75 which extend at right angles to the direction of relative movement of scale 2 and slider 3, these conductors being connected for reverse direction of current flow in adjoining conductors, the space wave length of one cycle, which includes the following widths, namely, twice the amount of one-half the spacing between adjoining conductors, plus a space between adjoining conductors, plus twice the width of a conductor, being equal to .1 inch. In the assumed case where the scale is 10 inches long, the fine winding 7 has a length equal to one hundred cycles of the coupling wave.

In FIG. 4, the medium winding 6' consists of one group 76 of parallel conductors having reverse current flow in adjoining conductors, the conductors in the group 76 being inclined at an acute angle in one direction to the direction of travel which is parallel to the line 77, while the similar conductors of the other group 78 are inclined an equal amount in the opposite direction. The connecting portion 79 connects the conductors of the groups 76 and 78 additively. The purpose of the construction just described is to compensate for any non-rectilinear movement of the slider.

The medium winding 6', in FIG. 4, over the 10-inch length of its active conductors in a direction parallel to line 77 has a wave length of 1 space cycle of the coupling wave, which means that as in the case of winding 7, and also winding 5, there is one pole per conductor and the displacement of each of the ends like 80 at the right end of the conductors like 81 from the corresponding left end like 82 of the conductor is equal to the sum of twice the width of a conductor like 81 plus twice the width of the air gap like 83 between adjoining conductors. The amount of offset is inversely proportional to the number of conductors per cycle, from which it follows that the opposite ends of each conductor are displaced in the plane of the conductors in a direction normal to a line parallel to the direction of motion by $2P/n$ where P is the pitch of the conductors in said normal direction and $n$ is the number of windings in one space cycle in said direction of motion. The winding 6' is symmetrical about line 77 which is its horizontal axis, each of the groups 76 and 78 having four and one-half conductors. The gap 84 at the apex of the half-length conductors on the vertical center line and the gap 85 at the apex of the adjoining conductors 81 and 88 at the left end of the winding have the same value as the gaps 83, this value for example being .01666 inch and the width of each conductor like 81, 86, 87, 88 being .0333 inch.

The displacement of one space cycle over the length of winding 6' means that if another scale like scale 2 is mounted at the right of scale 2', FIG. 4, while preserving the same gap between the last conductor 89 of the fine winding 7' and the first conductor corresponding to 72 of the scale not shown on the right as the gap between adjoining conductors like 72, 73, the right end 90 of conductor 86 will be extended in alignment in effect, with the left end corresponding to 91 of conductor 92 of the adjoining winding like 6', with current flowing in the same direction in both conductors as indicated by the arrows, as will be apparent from FIG. 7 which similarly shows the continuation of the conductor direction and current flow from one scale to the next as applied to a series of coarse windings.

The ratio of the length of the coupling wave of the fine winding 7 to the length of the coupling wave of the medium wave 6 is 100 to 1.

The conductor width and spacing of the coarse winding 5' are the same as for the medium winding 6'. The assumed 10-inch length of the scale and of the active conductors of the coarse winding 5' correspond to $1/40$ space cycle, so that it will require the 400-inch length of 40 scales placed end-to-end to offset the right end of each conductor at the 40th scale, from its left end at the start of the first scale by an amount (equal to the sum of twice the conductor width plus twice the conductor gap) the same as accomplished over the 10-inch length of the medium scale 6'. For this purpose, as in the case of the medium scale 6', the coarse winding 5' has a group 93 of parallel conductors acutely inclined to the axis 94 of the winding, parallel to the direction of travel of the slider 3, the right end of the group being offset from axis 94 farther than the left end of the group, as more clearly appears in later description and as shown in FIG. 9 which illustrates the acute inclination of the conductors of the coarse scale over a length of one cycle, FIG. 4 showing only $1/40$ of the left end of FIG. 9, namely the first $1/40$ cycle as noted on the drawing at the top FIG. 4. Also, as in the case of winding 6', the coarse winding 5' has another group 95 of parallel conductors equally and oppositely inclined, the lead 96 connecting the groups 93 and 95 additively to compensate for lateral displacement of the slider 3.

In FIG. 4 and also in FIG. 5, all of the conductors of windings 5, 6 and 7, also 5', 6' and 7', lie in one plane. The connecting leads at one edge as indicated between lines 67 and 69 extend at right angles to their respective active conductors and hence such leads are non-inductively related to their conductors. Those leads on the inner face like 62 (FIG. 3) as indicated at the left of line 67 in FIG. 4 are remote from the plane of the active conductors of windings 5', 6' and 7' and the same applies to the leads of the inner face like 63 as indicated at the right of line 68.

The connecting leads between the lines 67 and 69 in FIG. 4 represent the leads at the edge like 61 of scale 2 and include the following: Lead 97 to one end of the fine winding 7, the lead portion 297 which connects with the lead 98 which extends along and at one side of the winding 7'; four leads like 99 which connect the ends of adjacent conductors of winding 6' in series; lead 96, two leads like 100 which connect their conductors in series in winding 5', lead 101 which connects with one of the terminals indicated at 9' and lead 102 which connects with the other terminal indicated at 9'.

The reverse or inner face of the scale has the leads in terminals indicated at the left of line 67 in FIG. 4, namely lead portions 103 and 104 which extend to terminal 10'; and lead portions 105 and 106 which extend to terminal 9'.

The connecting leads between the lines 70 and 68 in FIG. 4 represent the leads at the edge like 65 of the scale 2 and include the following: Lead 107 which connects the right end of winding 7' with lead 98; lead portion 108 which connects with one of the terminals at 11', four connectors like 109 which connect adjacent conductors in series in winding 6', lead portion 110 which leads to the other terminal at 11'; and four leads like 111 which connect adjacent conductors in series in winding 5'.

FIG. 5 is a developed winding diagram of the twentieth scale 2 of a series, the leads extending in a fold around the edge of its base 8 and terminating in terminals 9, 10 and 11, which correspond to terminals 9', 10' and 11' of FIG. 4, all as explained in connection with FIG. 4. The medium winding 6 is exactly the same as medium winding 6' of the first scale in the series, and the fine winding 7 is exactly the same as the fine winding 7' of the first scale in the series, as the space cycle for both of these windings is complete within the length of one scale.

It was previously explained that the coarse scale winding, over the length of forty scales in the example shown is displaced one space cycle which is a distance equal to the sum of twice the conductor width plus twice the conductor gap. As the coarse winding 5 is the twentieth winding, the displacement of its conductors, in a direction transverse to the line 294, co-extensive with axis 94, which is parallel to the direction of motion of the slider, is one-half of the above amount or the width of one conductor indicated for example as being .03333 plus the conductor gap which has been taken for example as .01666. For the intermediate scale in the series of 20, the lateral displacement of the right ends of the conductors of winding 5 from the winding axis 294 is proportionally greater, the conductors at the right end of the second and subsequent scales forming continuations, with current flow in the same direction, of the corresponding conductors at the left end of the preceding scale.

It was previously pointed out that adjoining scales are fitted together so as to preserve the uniform spacing between the last conductor like 89 of the fine winding 7' in FIG. 4 and the adjoining conductor, not shown on the next scale at the right. In so doing, there is an unavoidable gap between the right ends of the conductors of the coarse and medium windings 5' and 6' and the left end of the corresponding conductors in the next scale, but the error thus encountered is negligible as such gap is very small in proportion to the length of the slider which therefore sees a substantially constant length of the conductors as it travels from one scale to another.

Referring to FIG. 6, this is a developed plan view of the windings 14, 15 and 16 of the slider 3, the drawing in FIG. 6 being on the same scale as FIGS. 1 and 3 in a horizontal direction and enlarged four times in a vertical direction. The fine winding indicated at 16 consists of sixteen sub-groups of W conductors numbered 1 to 16 and connected as shown in FIG. 14, the leads for these groups being taken out through the sixteen holes indicated at 117 in FIG. 1. These sixteen sub-groups are connected to form two groups 118 and 119 in space quadrature of the pole cycle of the fine scale winding 7, the conductor width and spacing being the same for the conductors of groups 118 and 119 on the one hand and winding 7 on the other hand. The sixteen sub-groups in the groups 118 and 119 are connected as shown in FIG. 14 and in the bottom portion of FIG. 2 of Foster Patent 2,915,722, the connection being in a special order for the purpose of avoiding or reducing quadrature shift, the quadrature windings being balanced about the same center line 146. The group 118 in FIG. 14 has a terminal 22 shown in FIG. 1 and similarly the group 119 has the terminals 23 shown in FIG. 1.

The windings 14, 15 and 16 in FIG. 6 are all in one plane which remains parallel to the plane of windings like 5, 6 and 7 during movement of the slider.

As explained in connection with FIG. 4, the return conductors like 120 and 121 and the lead portions like 122 of the slider winding 14 in FIG. 6, as well as the corresponding return conductors 123 and 124 and lead portions 125 of winding 15 lying between the lines 126 and 127 constitute the winding portions at the edge 128 of the slider 3, see FIG. 3, while the lead portions extending to the terminals 20 and 18 to the left of line 126, are on the front 17 of the slider which is the reverse side from the opposite side which carries active conductor portions.

The slider 3 has a base 12 similar to the base 8 of the scale, e.g., of iron material, and the conductors 14, 15 and 16 are formed and bonded to the base 12 in the same manner as described in connection with the scale windings in FIG. 15.

The lead portions like 130, return conductors like 131 and 132 for winding 14 in FIG. 6, as well as lead portions like 133, return conductors like 134 and 135 lying between the lines 136 and 137 are at the edge 138 of the slider in FIG. 3, while the leads extending to the terminals 19 and 21 at the right of line 137 in FIG. 6 appear at the front 17 of the slider.

The medium winding 15 in FIG. 6 consists of two windings 139 and 143 of conductors which extend parallel to the direction of relative movement of slider 3 and scales like 2, this direction being indicated by arrows 140 along the axis 147 of winding 15. The winding 139 consists of two groups, 141 and 142, one pair of conductors resembling a hairpin in each group, these two groups 141 and 142 each having parallel conductors connected in series for current flow in opposite directions in adjacent conductors, the conductor width and spacing being such that, as shown in FIG. 9, the conductors of groups 141 and 142 of the winding 139 in FIG. 6 are in space quadrature of the pole cycle of their associated scale conductors in the group 76 in FIG. 4. The winding 143 in FIG. 6 is similar to the winding 139 being located an equal distance on the opposite side of the axis of the winding and containing conductor groups 144 and 145 having conductors which are in space quadrature of the pole cycle of the winding 78 in FIG. 4. Groups 141 and 144 are connected additively by return conductor 135 and groups 142 and 145 are connected additively, by the return conductor 124.

The coarse slider winding in FIG. 6 is similar to the medium slider winding 15, in that it consists of two windings 148 and 149 of conductors which extend parallel to the direction of relative movement of slider 3 and scale 2, this direction being indicated by arrows 140. As described in connection with the medium slider and scale windings, the winding 148 has two groups 150 and 151 of conductors in space quadrature of the pole cycle of its associated conductors in group 93 in FIG. 4. Winding 149 consists of two groups 152 and 153 of conductors in space quadrature of the pole cycle of the conductors of its associated group 95 in FIG. 4, the conductors of groups 150 and 153 being connected additively, also the conductors of groups 151 and 152 being connected additively.

The space quadrature relation between the winding 14 of the slider and its associated windings like 5 of the scale will be further explained in connection with FIG. 9, this explanation applying equally to the space quadrature relation between the medium winding 15 of the slider and its associated scale windings like 6, by reason of the fact that FIG. 9 shows the scale winding 5 as extending over one cycle. As previously explained, this one cycle in the case of the coarse scale would include forty scale units like that shown in 2 in FIG. 1 and each 10 inches long, for example, to accommodate a machine travel of 400 inches, whereas in the case of the medium scale, a full cycle has a length of ten inches, the assumed length of one scale unit.

In FIG. 9, the slider winding 154 is schematically represented as a single line which corresponds to the center line of the conductors in group 14, it being noted that the longitudinal center of the group 153 in FIG. 9 is centered over the air gap 155, while the longitudinal center of the group 152 is centered over the conductor 156, similar conditions existing for the relation of the conductors of slider winding 148 to scale winding like 93, these relations constituting a space quadrature relation between the respective slider and scale windings.

In accordance with the present invention and as shown, for example, in FIG. 9, the transducer is divided into two transducer portions, an upper transducer portion comprising a single winding 93 and windings 148 which comprise two space-phased windings 150 and 151, and a lower transducer portion comprising a single winding 95 and windings 149 which comprise two space-phased windings 152 and 153.

The upper and lower portions of the transducer, individually, are extremely sensitive to displacement in directions transverse to the direction of normal displacement of the relatively movable members. For example, for a normal one-inch displacement of the medium transducer members, an output signal would be produced the same as with a .010 inch transverse displacement, and for a normal one-inch displacement of the coarse transducer member, an output signal would be produced the same as with a .00025 inch transverse displacement.

The conductors 93 are inclined with respect to the direction of normal displacement 140. The conductors 95 are oppositely inclined with respect to direction 140. By properly combining the upper and lower portions into one transducer, these difficulties are eliminated. The windings of the upper and lower transducer portions are so connected that additive signal voltages are produced for normal displacements and subtractive signal voltages are produced for transverse displacements.

By these means the transducer of FIG. 9, for example, is made insensitive to transverse motions and therefore does not require such precise rectilinear guidance as would be impossible to achieve.

The windings 150 and 153, connected in series, are at maximum coupling with the windings 93 and 95 while the windings 151 and 152, connected in series, are at minimum coupling with windings 93 and 95. In other words, both the upper and lower transducer are at zero position. The zero position of the transducer can be shifted by changing the spacing between the center of windings 148 and the center of the windings 149.

For example, if it is desired to shift the zero position to the left in this figure, the distance between the centers of windings 148 and windings 149 should be decreased correspondingly and likewise to shift the zero position to the right, the distance between these said windings should be increased correspondingly.

It is desirable to establish zero at a position of complete overlap of the members of the fine transducer. An electrical zero position of the fine transducer having, for example, a space cycle of .100 inch, will occur at every .05 inch. A convenient zero position of 2.5 inches for all of the windings of the multiple transducer illustrated in FIG. 1 may be chosen. At this position the windings of the fine transducer will be at zero, i.e., one space phase winding of the winding 16 of member 1 will have a maximum coupling and the other space phase winding of the winding 16 will have a minimum coupling to the winding 7 of the member 2. The spacing between the centers of the windings of the upper and lower halves of both the medium and coarse transducers, as described above, are chosen so that there respective space phase windings will also be at zero position.

Should it be desired to change the position for zero from one longitudinal position to another, this may also be accomplished by the relative rotation of the resolvers 189, 190 and 191 of FIG. 10 or by changing the voltage ratios of transformers 201.

FIG. 7 is a schematic diagram of the connections between three typical single phase coarse windings 164, 161 and 162 like the coarse winding 5' in FIG. 4, each of the windings constituting a fraction of one space cycle, namely one-fortieth cycle in a typical case. FIG. 7 illustrates that the corresponding conductors like 157, 158 and 159 of successive scale winding 164, 161 and 162 are substantially in alignment, each conductor like 158 and 159 forming a continuation of and having the same slope as the corresponding conductor like 157, with current flowing in the same direction in all three of these conductors. The same applies to the other corresponding conductors in the three windings 164, 161 and 162 illustrated. It follows that the start of left end like 160 of a conductor 158 of a group 161 (corresponding to the winding 5' in FIG. 4), has substantially the same lateral offset from the axis 176 as the right end 163 of the corresponding conductor 157 in the preceding group 164. This same relation exists between the conductors of any one group and the conductors of the preceding group.

From the preceding explanation in connection with FIG. 7, it will be understood that if the system is to have forty scales like 164, 161 or 162, it would require the construction of forty different scales because the offset of the winding from the axis increases from scale to scale to preserve a constant slope of the successive scale conductors like 157, 158 and 159. According to a further feature of the invention, as illustrated in FIG. 8, it is possible to make provision for a machine travel of 400 inches in the assumed case, with only twenty different scales each 10 inches long. As shown in FIG. 8, the winding 265 illustrates a group of twenty scales like scale 2 in FIGS. 1 and 2, arranged in sequence, end-to-end and connected in series. In the assumed case, or one-half space cycle, it is possible to increase that one-half cycle by any multiple of 1/40 cycle up to an additional one-half cycle for group 267 by employing as the twenty-first scale 266, or subsequent scales, a scale or scales identical with the first scale or scales in the group indicated at 265, and by reversing the connection from the group 265 to the added scale or scales in excess of the group 265. This reversal of connection is illustrated at 268, it now being noted that the conductor 269 in FIG. 8 is in alignment with conductor 270 and with current flowing in the same direction, likewise for conductors 271 and 272 and for conductors 273 and 274; the same being true for the corresponding conductors on the other side of the axis 275. As a consequence, if it is desired to accommodate a machine travel of 250 inches with scales each 10 inches long, 200 inches of the travel can be accommodated by twenty scales represented by the group 265 in FIG. 8, followed in sequence by scales which are identical with the first five scales in group 265, the connections between the two groups being reversed as indicated at 268. Of course, this applies to any additional number of scales in the second group indicated at 267 up to the additional one-half cycle of the second group to make one complete space cycle represented by the sum of groups 265 and 267, while employing only that number of different scales required for one-half space cycle.

While the transducers herein described are of the three-winding resolver type, it will be understood that the present invention is applicable to other forms of rotary and linear transducers where the space phase windings are displaced by space phase angles other than ninety degrees.

It will also be understood that while electromagnetically coupled transducers are illustrated herein that the present invention is applicable to electrostatically coupled transducers.

We claim:

1. A precision transducer comprising a scale having oppositely inclined groups of conductive strips disposed side by side and connected for current flow in opposite directions in successive strips, a slider mounted parallel and in proximity to said scale for relative displacement between said scale and said slider in a predetermined direction, a support having opposite ends and a longitudinal axis parallel to said direction of relative displacement, the conductive strips of said scale being linear and extending from one end of said support to its other end at an acute angle to said axis, return leads at each end of said support for connecting the conducting strips of both said groups into a series circuit, said return leads extending away from said plane, said slider having corresponding groups of conductive strips substantially parallel to said direction of relative displacement and connected for current flow in opposite directions in successive strips, said conductive strips of said scale and of said slider being inductively related transformer members, whereby electrical signals can be inductively transferred from one group of strips to the other with an amplitude ratio responsive to relative displacement between the scale and the slider in said direction.

2. A precision transducer according to claim 1, the conductive strips of said scale lying in a plane and extending in the direction of motion, each of said conductive strips of said scale having opposite ends displaced in said plane in a direction normal to a line parallel to the direction of motion by $2P/n$ where P is the pitch of the conductive strips in said normal direction and $n$ is the number of windings in one space cycle in said direction of motion.

3. A precision transducer according to claim 1, the conductive strips of both of said groups of said scale lying in a plane and extending in the direction of motion, the conductive strips of each of said groups of the scale having opposite ends displaced in said plane in a direction normal to a line parallel to the direction of motion by $2P/n$ where P is the pitch of the conductive strips in said normal direction and $n$ is the number of windings required to produce one cycle in said direction of motion.

4. A precision transducer comprising a scale and a relatively movable slider, said scale comprising a plurality of sections, each having a support having opposite ends, each section having a plurality of grades of single phase windings, each having a longitudinal axis parallel to the direction of relative movement, each grade having groups of linear conductors oppositely inclined to its axis and the conductors of each group extending at an acute angle to its axis from one end of said support to its other end, the groups of each grade having return leads at the opposite ends of said support for connecting the conductors and groups of each grade in a series circuit, the conductors of each group being connected for current flow in opposite directions in successive conductors, said slider having a cooperating inductively related winding for each grade of the windings of said scale, said slider windings for each grade comprising parallel conductors connected for current flow in opposite directions in successive conductors and extending parallel to the direction of relative movement, said slider windings being arranged in groups in space quadrature of the pole cycle of their associated scale windings, said plurality of grades of scale windings representing different values of selected space cycles, each corresponding scale winding of the sections representing a fraction of the space cycle represented by the other winding of that section, said sections fitting end to end and the corresponding scale windings of the same grade of each section being connected together.

5. A transformer for the measurement or definition of relative linear position, said transformer comprising scale and slider members relatively movable in a linear direction, said transformer being characterized by the fact that said scale bears two groups of linear conductors arranged side by side in a plane on a support having opposite ends, said conductors extending lengthwise of and having opposite ends at the opposite ends, respectively, of said support, return leads at the opposite ends of said support for connecting said conductors for current flow in opposite directions in successive conductors, said return leads extending away from the plane of said conductors, the conductors of each group extending parallel to the other conductors of that group, the conductors of the two groups being inclined at equal and opposite angles to the direction of relative motion of said members, the conductors of the two groups further having within each group a uniform spacing and being connected all into a single series circuit, said transformer being further characterized by the fact that said slider bears at least two groups of parallel conductors, the conductors of each of said last mentioned groups being in inductive relation with the conductors of a separate one of the groups on said scale, each group of the conductors on said slider having a uniform spacing of conductors connected into a single series circuit with opposite directions of current flow in adjacent conductors within each group.

6. A transformer for the measurement or definition of relative linear position, said transformer comprising scale and slider members relatively movable in a linear direction, said transformer being characterized by the fact that said scale comprises a series of member units fitting edge to edge, each scale unit having a support having opposite ends, said support bearing two groups of linear conductors extending from one end of the support to the other end, the conductors of each group on each unit extending parallel to the other conductors of that group, the conductors of the two groups on each unit being inclined at equal and opposite angles to the direction of relative motion of said scale and slider members, the conductors of the two groups further having within each group a uniform spacing and being connected all into a single series circuit, each group of conductors of the scale on succeeding units of the series including conductors forming extensions of and in alignment with conductors of the corresponding group of a preceding unit and connections connecting said corresponding conductors of each group of the scale on different units for current flow in the same direction, said transformer being further characterized by the fact that said slider bears at least two groups of parallel conductors, the conductors of each of said last-named groups being in inductive relation with the conductors of a separate one of the groups on said scale, each group of the conductors on said slider having a uniform spacing of conductors connected into a single series circuit with opposite directions of current flow in adjacent conductors within each group, the conductors on the said slider extending parallel to the direction of relative motion of said members.

7. A precision measuring transformer consisting of a scale member and a slider relatively movable in a linear direction and each having a support with a winding in a plane, the windings being inductively related, the scale winding being in the form of oppositely inclined groups of linear conducting strips to compensate for side-lash, characterized in this that the scale conductors extend at an acute angle from one end of its support to the opposite end thereof, with a set of return leads at each of said ends connecting the scale conducting strips into a series circuit, each set of return leads extending away from the plane of their conducting strips.

8. A precision measuring transformer according to claim 7, wherein a series of said scale members fitting end to end is provided, the scale conducting strips of subsequent members of the series being extensions of preceding members, the separation of the groups at each end of the member increasing from member to member.

References Cited by the Examiner
UNITED STATES PATENTS

| | | | |
|---|---|---|---|
| 2,685,070 | 7/54 | Childs | 318—28 |
| 2,799,835 | 7/57 | Tripp et al. | 336—123 |
| 2,836,803 | 5/58 | White et al. | 336—129 X |
| 2,844,802 | 7/58 | Tripp et al. | 336—123 |
| 2,848,670 | 8/58 | Kelling et al. | 318—28 |
| 2,849,688 | 8/58 | Tripp | 318—28 |
| 2,866,946 | 12/58 | Tripp | 318—28 |
| 2,885,645 | 5/59 | Wennerberg | 336—120 |
| 2,900,612 | 8/59 | Tripp | 318—28 |
| 2,907,937 | 10/59 | Agpar et al. | 318—28 |
| 2,915,721 | 12/59 | Farrand et al. | 318—28 |
| 2,915,722 | 12/59 | Foster | 318—28 |
| 2,921,280 | 1/60 | Litwin et al. | 336—232 X |
| 2,924,798 | 2/60 | Foster | 318—28 |
| 2,994,051 | 7/61 | Spencer et al. | 336—30 X |

JOHN F. BURNS, *Primary Examiner.*

MILTON O. HIRSHFIELD, *Examiner.*